(12) United States Patent
Lam et al.

(10) Patent No.: US 12,380,771 B1
(45) Date of Patent: Aug. 5, 2025

(54) SELF-CHECKOUT METHOD, SYSTEM, DEVICE AND KIT INTEGRATED WITH SENSORS AND ARTIFICIAL INTELLIGENCE

(71) Applicant: FLYTECH TECHNOLOGY CO., LTD., Taipei (TW)

(72) Inventors: Tai-Seng Lam, Taipei (TW); Shui-Chin Tsai, Taipei (TW); Li-Chun Chou, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 18/646,944

(22) Filed: Apr. 26, 2024

(30) Foreign Application Priority Data

Feb. 7, 2024 (TW) .................................. 113105109

(51) Int. Cl.
| | |
|---|---|
| G07G 1/00 | (2006.01) |
| G06V 10/74 | (2022.01) |
| G06V 20/52 | (2022.01) |
| G06V 20/64 | (2022.01) |
| G06V 40/10 | (2022.01) |
| G06V 40/20 | (2022.01) |

(52) U.S. Cl.
CPC ......... G07G 1/0054 (2013.01); G06V 10/761 (2022.01); G06V 20/52 (2022.01); G06V 20/64 (2022.01); G06V 40/10 (2022.01); G06V 40/28 (2022.01)

(58) Field of Classification Search
CPC .... G07G 1/0054; G06V 10/761; G06V 20/52; G06V 20/64; G06V 40/10; G06V 40/28
See application file for complete search history.

(56) References Cited

U.S. PATENT DOCUMENTS

| | | | | |
|---|---|---|---|---|
| 2017/0316397 | A1* | 11/2017 | Miyagi | .................. G06F 21/32 |
| 2019/0371134 | A1* | 12/2019 | Chen | .................... G06V 40/103 |
| 2021/0280027 | A1* | 9/2021 | Wen | ................. G08B 13/19608 |
| 2023/0196778 | A1* | 6/2023 | Miyagi | ............... G06Q 20/204 |
| | | | | 382/103 |

(Continued)

FOREIGN PATENT DOCUMENTS

EP 4401025 A1 * 7/2024 ........... G06Q 20/208

OTHER PUBLICATIONS

CN—115516532A Account payment device and checkout payment system, 57 pages. (Year: 2024).*

(Continued)

Primary Examiner — Tuyen K Vo
(74) Attorney, Agent, or Firm — Demian K. Jackson; Jackson IPG PLLC (57) ABSTRACT

The present invention relates to a self-checkout method. The method includes: executing following steps through a control module: activating a first image sensor to capture a first image that includes a hand; activating a second image sensor to capture a second image that includes an item; running a gesture recognition independent model to generate a first recognition result based on the first image; running an object recognition independent model to generate a third recognition result based on the second image; and executing and inputting the first recognition result and the third recognition result into a checkout assistance decision independent model to determine whether a missed scan event has occurred.

6 Claims, 8 Drawing Sheets

(56) References Cited

U.S. PATENT DOCUMENTS

| | | | |
|---|---|---|---|
| 2023/0316761 A1* | 10/2023 | Kurata | G06Q 20/206 |
| 2023/0345093 A1* | 10/2023 | Yepez | G06Q 20/18 |
| 2023/0368625 A1* | 11/2023 | Sanil | G06T 7/10 |
| 2024/0104535 A1* | 3/2024 | Kurata | G06Q 20/18 |
| 2024/0193995 A1* | 6/2024 | Ishida | G06V 20/52 |
| 2024/0251061 A1* | 7/2024 | Yamaguchi | G07G 1/0036 |
| 2024/0296677 A1* | 9/2024 | Brakob | G06Q 20/208 |

OTHER PUBLICATIONS

KR—20220086277A Anti-fraud monitoring system and method for self checkout, and monitoring apparatus applied to the same, 29 pages. (Year: 2024).*

* cited by examiner

FIG. 8

SELF-CHECKOUT METHOD, SYSTEM, DEVICE AND KIT INTEGRATED WITH SENSORS AND ARTIFICIAL INTELLIGENCE

CROSS-REFERENCE TO RELATED APPLICATION

This application claims priority benefit to Taiwan Invention Patent Application Serial No. 113105109, filed on Feb. 7, 2024, in Taiwan Intellectual Property Office, the entire disclosures of which are incorporated by reference herein.

FIELD

The present invention relates to a self-checkout method, system, device and kit, in particular to a self-checkout method, system, device and kit integrated with sensors and artificial intelligence so as to determine whether a missed scan event has occurred.

BACKGROUND

With the increase in labor costs and the impact of the COVID-19 pandemic, the retail industry has introduced unmanned stores and self-checkout systems. Self-checkout technology has become an important innovative trend. The goal of self-checkout technology is to use technology combined with electronic payment to achieve automatic identification and settlement of goods, thereby reducing the need for human labor. Existing mainstream self-checkout technologies are based on product weight detection, RFID (Radio Frequency Identification) tag detection, eTag (Electronic Tag) tag detection, pure image or visual recognition, and barcode identification technologies.

The weight-sensing method identifies the type and quantity of goods by measuring the weight of the goods at the checkout. However, this technology has the disadvantage of possibly causing identification errors for different items with close weights, and has poor recognition capability for multiple items. For example, if customers place multiple items on the scale at the same time, the system may have difficulty accurately identifying each item, resulting in missed scans. In addition, the weight of goods can be easily affected by packaging and the environment, increasing the risk of error.

The RFID tag sensing technology identifies goods by reading RFID tags attached to the goods. Although this technology can accurately identify goods, it is relatively expensive. For small or inexpensive goods, the higher cost of implementing RFID tag technology may not be affordable. In addition, RFID tags are susceptible to damage, and if the RFID tags are not properly placed on the goods, the reader cannot accurately read the goods information, resulting in missed scans.

The eTag tag sensing technology is similar to RFID, but uses electronic tags to store asset information. Similarly, eTag sensing technology requires investment in specific equipment and infrastructure, so there are still cost and practicality issues. eTag tags are also susceptible to damage, and incorrect placement on the goods can easily result in missed scans.

The pure image recognition technology relies on image analysis algorithms to identify goods. However, implementation costs are high and the technology has a high threshold. It is sensitive to ambient lighting and the placement angle of goods, and may have difficulty distinguishing between goods with similar appearances. When there are many types of merchandise, insufficient image resolution, unexpected blind spots, and dead angles in the line of sight, recognition errors can easily occur, resulting in missed scans or inability to check out.

The barcode identification technology accomplishes the purpose of identifying goods and checking out by reading barcodes attached to the goods. Although it is a widely used self-checkout technology, consumers often experience scanning inaccuracies, scanning errors, accidental missed scans of certain items, blocked barcodes, barcodes not properly placed in the scanning area, or barcodes not properly aligned with the scanner, resulting in missed items and an unsuccessful checkout. During busy periods, consumers may be distracted and forget to scan certain items, or when purchasing large items or many items at once, barcodes may not be properly aligned with the scanner, resulting in missed scans. There are many reasons why a certain number of items may be missed.

Overall, existing self-checkout technologies still cannot adequately detect missed scans of item barcodes, nor can they completely prevent customers from intentionally or unintentionally missing some items. The occurrence of missed scans not only leads directly to economic losses for the store owner, but also causes incorrect inventory records, which can lead to a chain of errors and management difficulties. Frequent occurrences of missed scans can exhaust business owners.

In addition, there are already a large number of traditional checkout cash management devices on the market that do not have self-checkout capabilities. However, a complete self-checkout system must include some hardware from these traditional devices. Therefore, these traditional devices can potentially be upgraded to self-checkout systems with appropriate adaptations and modifications.

In conclusion, the cost of software and hardware for self-checkout systems on the market is still high, which is a significant burden for many small and medium sized retailers. If existing cash management devices could be converted into self-checkout systems in the field, the construction costs of self-checkout systems would be greatly reduced. However, no one currently offers such an upgrade service or conversion technology.

Hence, there is a need to solve the above shortcomings and deficiencies.

SUMMARY

The present invention relates to a self-checkout method, system, device and kit, in particular to a self-checkout method, system, device and kit integrated with sensors and artificial intelligence so as to determine whether a missed scan event has occurred.

Accordingly, the present invention provides a self-checkout method includes: executing following steps through a control module: activating a first image sensor to capture a first image that includes a hand; activating a second image sensor to capture a second image that includes an item; running a gesture recognition independent model to generate a first recognition result based on the first image; running an object recognition independent model to generate a third recognition result based on the second image; and executing and inputting the first recognition result and the third recognition result into a checkout assistance decision independent model to determine whether a missed scan event has occurred.

The present invention further provides a self-checkout system includes: a first image sensor configured to capture a first image that includes a hand; a second image sensor configured to capture a second image that includes an item; and a control module configured to: run a gesture recognition independent model to generate a first recognition result based on the first image; run an object recognition independent model to generate a third recognition result based on the second image; and execute and input the first recognition result and the third recognition result into a checkout assistance decision independent model to determine whether a missed scan event has occurred.

The present invention further provides a self-checkout device includes: a first image sensor configured to capture a first image that includes a hand; a second image sensor configured to capture a second image that includes an item; and a control module configured to: run a gesture recognition independent model to generate a first recognition result based on the first image; run an object recognition independent model to generate a third recognition result based on the second image; and execute and input the first recognition result and the third recognition result into a checkout assistance decision independent model to determine whether a missed scan event has occurred.

The present invention further provides a self-checkout kit, attachable to a checkout management device, includes: a first image sensor configured to capture a first image that includes a hand; a second image sensor configured to capture a second image that includes an item; and a control module, integrated within the checkout management device or configured separately from the checkout management device but communicatively connected to the checkout management device, configured to: run a gesture recognition independent model to generate a first recognition result based on the first image; run an object recognition independent model to generate a third recognition result based on the second image; and execute and input the first recognition result and the third recognition result into a checkout assistance decision independent model to determine whether a missed scan event has occurred.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the authentic technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

Figure 1:
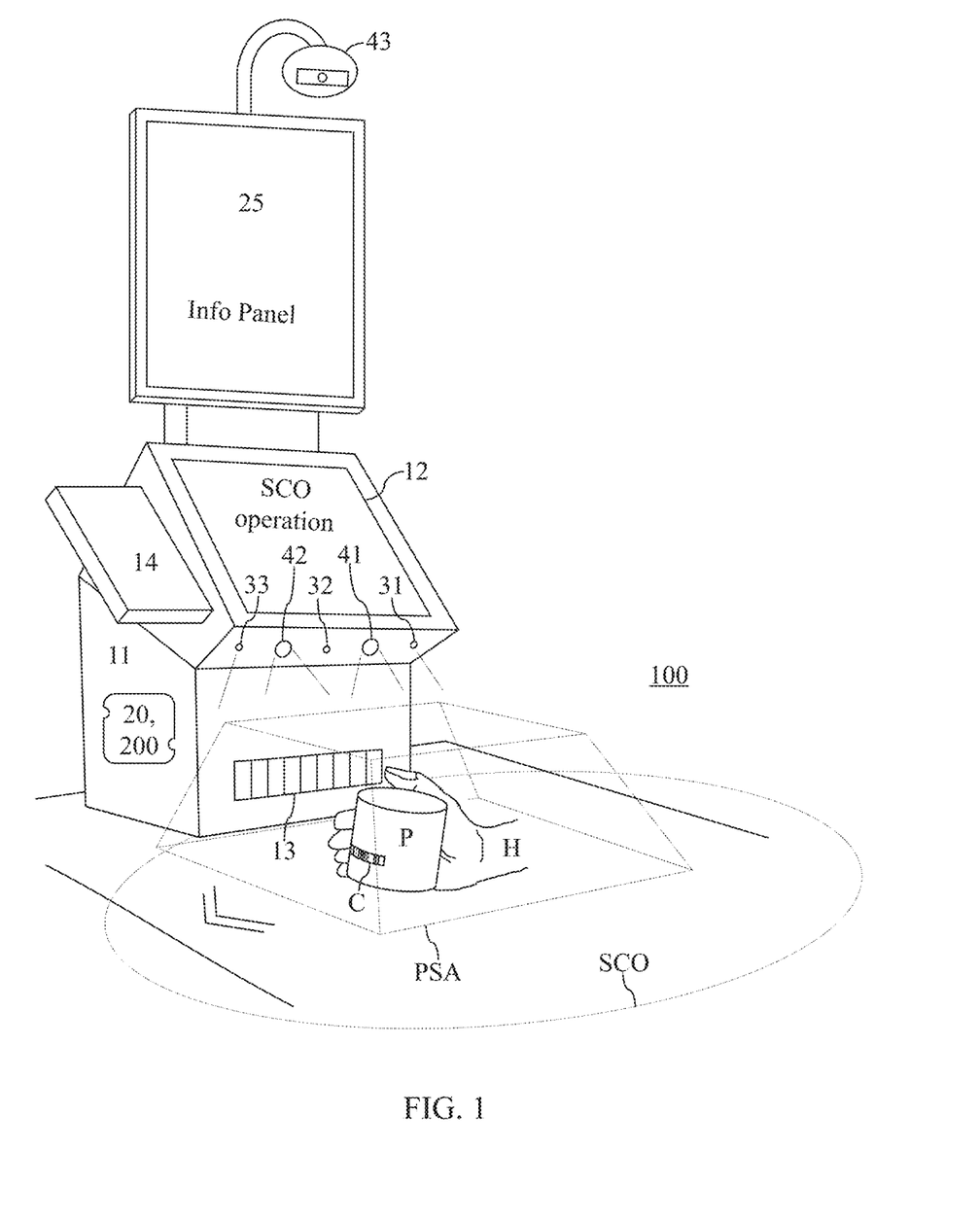
FIG. 1 is a schematic diagram illustrating the system architecture for the self-checkout system included in the present invention.

FIG. 1 is a schematic diagram illustrating the system architecture for the self-checkout system included in the present invention. In some embodiments, the self-checkout system (self-checkout device) 100 preferably includes a host computer 11, a touch screen 12, a code scanner 13, a card reader 14, a first proximity sensor 31, a second proximity sensor 32, a third proximity sensor 33, a first smart image sensor 41, a second smart image sensor 42, a high-position smart image sensor 43, a control module 20, and an information display 25, wherein the control module 20 is installed with self-checkout software 200 therein.

The host computer 11 is preferably an electronic device with point of sale (POS) machine functions, equipped with at least a touch screen 12, a code scanner 13, a card reader 14, and a control module 20, to achieve the basic manual checkout functions for a basic POS machine. The control module 20 is preferably configured inside the host computer 11, or alternatively, is configured separately from the the host computer 11 but communicatively connected to the internal control circuits of the host computer 11.

At the lower part of the self-checkout system 100 or the host computer 11, there is a group of item sensors arranged, including the first proximity sensor 31, the second proximity sensor 32, the third proximity sensor 33, the first smart image sensor 41, the second smart image sensor 42, and the code scanner 13. The group of item sensors is preferably configured and positioned below the self-checkout system 100 or the host computer 11, to form a virtual three-dimensional product sensing area PSA in front of the host computer 11.

The first proximity sensor 31, the second proximity sensor 32, and the third proximity sensor 33 are preferably distance sensors, time-of-flight (TOF) sensors, multi-object tracking (MOT) sensors, gesture recognition sensors, optical motion trackers, motion sensors, proximity sensors, active infrared (AIR) sensors, passive infrared (PIR) sensors, or consumer infrared (CIR) sensors.

Figure 2:
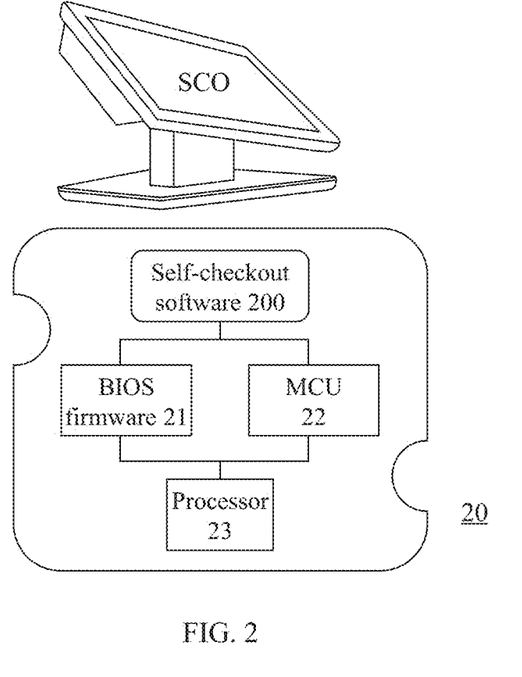
FIG. 2 is a schematic diagram illustrating the hardware architecture for the control module included in the present invention.

FIG. 2 is a schematic diagram illustrating the hardware architecture for the control module included in the present invention. The self-checkout method provided by the present invention is preferably reduced to practice in a form of self-checkout software 200, either a self-checkout computer program product, and implemented by being installed and running on the control module 20 contained in the self-checkout system 100. The control module 20 includes at least a basic input/output system (BIOS) firmware 21, a microcontroller unit (MCU) 22, a processor 23, and so on. The self-checkout software 200 is loaded by the processor 23 and executed jointly by the processor 23 and the MCU 22, so as to implement the self-checkout method through the control module 20, to perform various controls for the self-checkout system 100.

In some embodiments, the MCU 22 is primarily responsible for lower-level basic hardware control tasks, such as performing controls for peripheral hardware devices including but not limited to the code scanner 13, the card reader 14, the first proximity sensor 31, the second proximity sensor 32, the third proximity sensor 33, the first smart image sensor 41, the second smart image sensor 42, and the high-position smart image sensor 43, which includes at least performing basic input/output operation control for these peripheral hardware devices and collecting and processing of digital data generated by these devices. In some embodiments, the MCU 22 also participates in the energy consumption control for various hardware components, such as commanding the smart sensors to enter an idle state to reduce power consumption.

The control module 20 is configured to define and set up a certain area around the product sensing area PSA as a virtual self-checkout area SCO, and then detect whether a user enters the virtual self-checkout area SCO based on the images captured by the high-position smart image sensor 43, to initiate the self-checkout process accordingly.

When the self-checkout process is not initiated and triggered, the control module 20 controls the information display 25 and the touch screen 12 to play preset advertising content, and instructs the smart sensors included in the group of item sensors to enter a low-power standby state, thereby reducing the overall energy consumption for the self-checkout system 100.

When the control module 20 determines that a user has entered the virtual self-checkout area SCO based on images captured by the high-position smart image sensor 43, it immediately initiates the execution of the self-checkout process. Alternatively, if the control module 20 detects that any of the item sensors included in the group is triggered, the control module 20 also immediately initiates the execution of the self-checkout process accordingly.

Upon the initiation, the information display 25 begins to display guidance content regarding the standard operating procedures of the self-checkout, presenting and explaining the self-checkout operating steps to the user. At the mean time, the touch screen 12 is configured to activate and display the self-checkout operation interface, waiting for users to proceed with the self-checkout operations.

Figure 3:
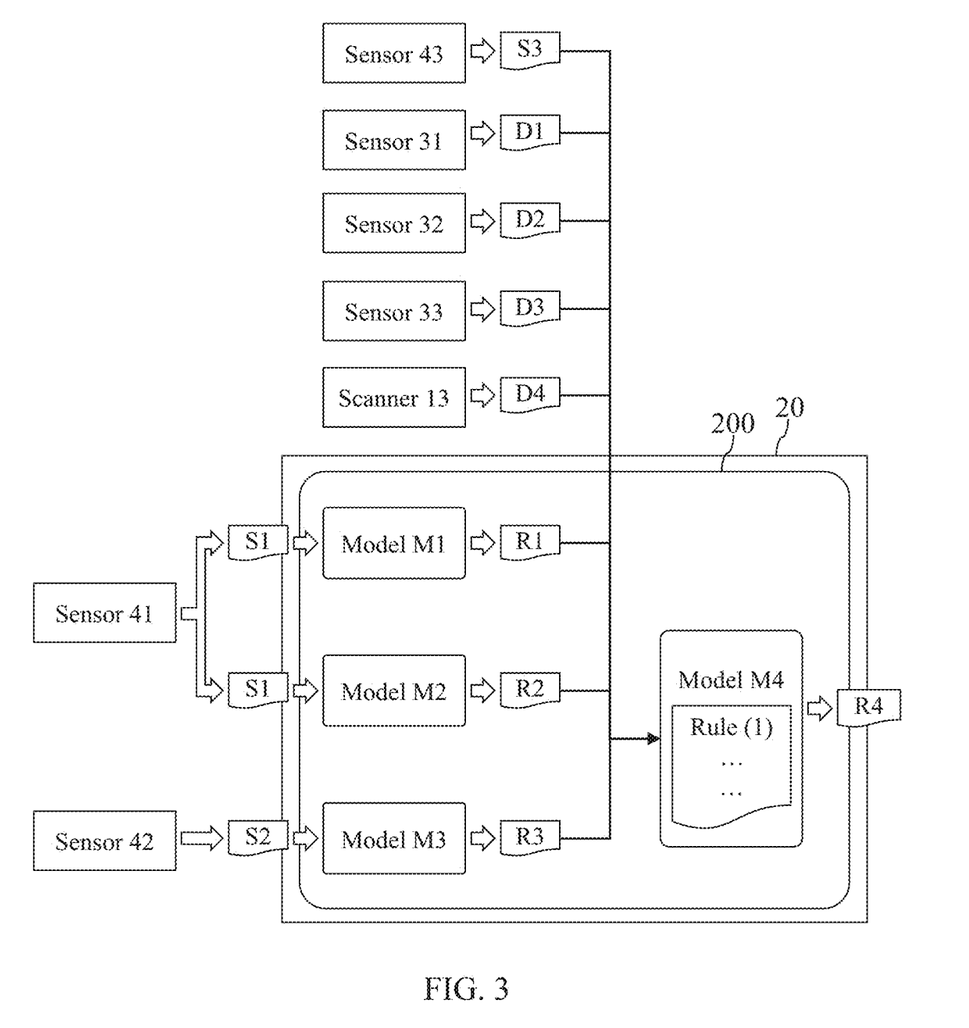
FIG. 3 is a block diagram illustrating the collaborative operation between the self-checkout software and various hardware components included in the present invention.

FIG. 3 is a block diagram illustrating the collaborative operation between the self-checkout software and various hardware components included in the present invention. The self-checkout software 200 is configured to be executed by the control module 20 and includes four independent models: a gesture recognition independent model M1, an information code recognition independent model M2, an object recognition independent model M3, and a checkout assistance decision independent model M4.

In some embodiments, the first proximity sensor 31, the second proximity sensor 32, and the third proximity sensor 33 are preferably TOF sensors. The first proximity sensor 31 is preferably configured to sense the first distance information with respect to the hand H, the information code C labeled on the item P, or the item P itself within the product sensing area PSA, and to generate the first sensing output D1 accordingly. The second proximity sensor 32 is preferably configured to sense the second distance information with respect to the hand H, the information code C labeled on the item P, or the item P itself within the product sensing area PSA, and to generate the second sensing output D2 accordingly. The third proximity sensor 33 is preferably configured to sense the third distance information with respect to the hand H, the information code C labeled on the item P, or the item P itself within the product sensing area PSA, and to generate the third sensing output D3 accordingly. The code scanner 13 is preferably configured to read the information code C labeled on the item P within the product sensing area PSA, and to generate the fourth sensing output D4 accordingly.

The first smart image sensor 41 is preferably configured to capture a first image S1 within the scope of the product sensing area PSA, including the hand H and the information code C appearing on the item P. The second smart image sensor 42 is preferably configured to capture a second image S2 within the scope of the product sensing area PSA, including the item P, wherein the item P is preferably attached with an information code C that can be read by the code scanner 13. The form of the information code C includes but is not limited to: one-dimensional barcodes and two-dimensional QR codes, etc. The information code C is used to store various information, including but not limited to the item name, place of production, manufacturer, production date, item price, etc.

The high-position smart image sensor 43 is preferably configured in a place at the top position of the self-checkout system 100. For example, the high-position smart image sensor 43 is integrated within the top frame above the information display 25 or mounted on a bracket at the top of the information display 25. By being positioned at a higher location, the high-position smart image sensor 43 is capable of acquiring a larger and wider field of view (FOV), panoramically capturing and recording the complete self-checkout process performed by a user, and generating a third image S3.

After the self-checkout process is initiated and performed, the control module 20 is preferably configured to input the first image S1 captured by the first smart image sensor 41 into both the gesture recognition independent model M1 and the information code recognition independent model M2, so as to identify whether the first image S1 contains a hand and a gesture skeleton, to recognize if the gesture skeleton includes a checkout gesture signifying the intent to checkout, and to output the first recognition result R1, by the gesture recognition independent model M1, and so as to identify the information code contained in the first image S1, and to output the second recognition result R2, by the information code recognition independent model M2.

The control module 20 is preferably configured to input the second image S2 captured by the second smart image sensor 42 into the object recognition independent model M3, so as to identify whether the second image S2 contains items and their names and to output the third recognition result R3 by the object recognition independent model M3.

Subsequently, the control module 20 is preferably configured to input the first recognition result R1, the second recognition result R2, and the third recognition result R3 into the checkout assistance decision independent model M4, to output the fourth recognition result R4.

The checkout assistance decision independent model M4 is preferably a rule-based machine learning model that operates based on, for example, rules that include, but are not limited to, the following:

Rule (1): When the third proximity sensor 33 detects that the distance between the item P and the code scanner 13 is greater than the effective sensing range of the code scanner 13, and the second recognition result R2 indicates that the information code C labeled on the item P has been successfully captured, and the user's gesture skeleton includes a checkout action, the control module 20 determines that the barcode is placed at a distance too far beyond the reading range of the code scanner 13, causing a barcode out-of-range event. The control module 20 is configured to control the touch screen 12 to display a prompt message advising the user to move the item closer to the scanner.

Rule (2): When the third recognition result R3 indicates that an item has been successfully recognized and the second recognition result R2 indicates that the user's gesture skeleton includes a checkout action, but the code scanner 13 fails to read the information code, the control module 20 determines that a missed scan event has occurred. The control module 20 is configured to control the touch screen 12 to display an item scan failure prompt message, advising the user to check out again whether the item's barcode is properly aligned with the code scanner 13.

Rule (3): When the third recognition result R3 indicates that the detected number of items is N1, but the number of items successfully scanned by the code scanner 13, N2, is not equal to N1, and N1 is greater than N2, it is determined that a missed scan event has occurred. The control module 20 is configured to control the touch screen 12 to display a missed scan prompt message, advising the user to see if any item has been missed scanning. If N1 continues to be greater than N2, the control module 20 is configured to lock out the touch screen 12 and to disable the touch screen 12 to temporarily suspend the self-checkout process, and to notify the back-end management staff.

Rule (4): When the third recognition result R3 indicates that the detected number of items is N1, but the number of items scanned by the code scanner 13, N2, is not equal to N1, and N2 is greater than N1, it is determined that a double checkout event has occurred. The control module 20 is configured to control the touch screen 12 to display a double checkout prompt message, advising the user to confirm whether a double checkout condition has occurred.

Rule (5): When the third recognition result R3 indicates that the detected item P has disappeared, it is determined that an abnormal checkout event has occurred. The control module 20 is configured to lock out the touch screen 12 and to disable the touch screen 12 to temporarily suspend the self-checkout process, and to notify the back-end management staff.

The checkout assistance decision independent model M4 is a self-checkout assistance decision model. As shown in FIG. 3, the checkout assistance decision independent model M4 receives all sensing outputs D1-D4, all images S1-S3, and all recognition results R1-R3 generated by the self-checkout system 100. Then, the checkout assistance decision independent model M4 is configured to identify consumers' consuming behavior and to determine whether any item was missed scanning during the self-checkout process based on built-in default rules, and to output the fourth recognition result R4. By increasing the number of built-in default rules within the checkout assistance decision independent model M4 and optimizing these rules, the comprehensive capabilities of the model M4 can be significantly enhanced.

Figure 4:
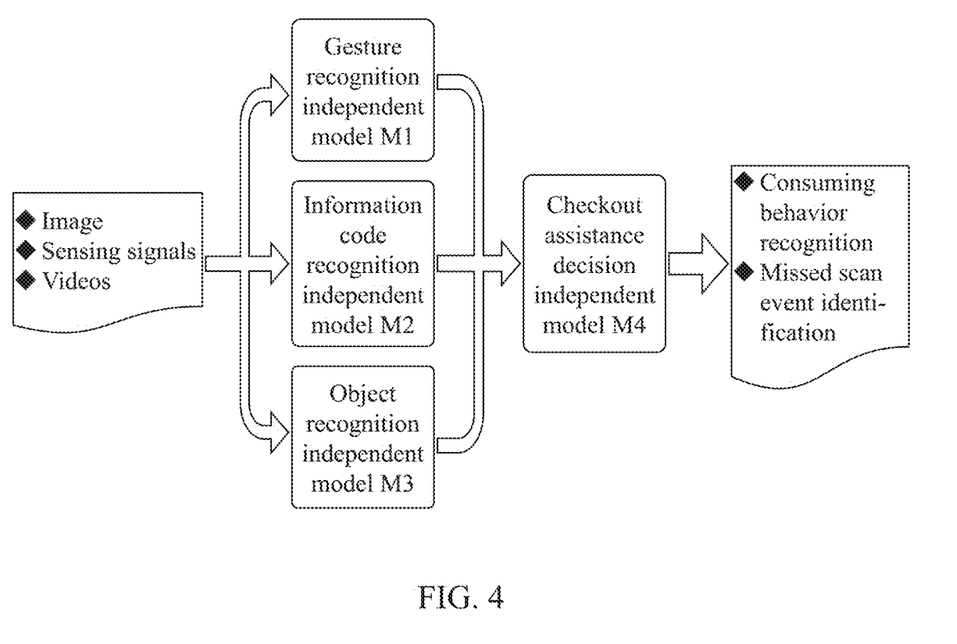
FIG. 4 is a block diagram illustrating the deep learning model included in the present invention.

FIG. 4 is a block diagram illustrating the deep learning model included in the present invention. In the present invention, multiple independent small models that perform different recognition tasks are used instead of integrated large models. Typically, large models not only occupy memory space, but also consume significant computational power and memory. By splitting into task-specific independent small models, both the storage space occupied by all small models and the demand for computational power and memory are significantly reduced. In addition, these small models can directly apply pre-trained models, further reducing the cost of model training, or use open source models to further reduce the cost of model construction.

In general, large supervised deep learning models require a large amount of labeled training data for training, and more labeled training data means higher development costs. Moreover, if large supervised deep learning models can be divided into several smaller models for separate training before training integration, it would be easier to converge than direct end-to-end training.

Based on these two principles, the present invention proposes a training method and decision system for detecting consumer checkout behavior by combining multiple shared smaller models in series instead of a single large end-to-end model, thereby reducing the difficulty and cost of training models.

In the present invention, model training is performed in two different stages. In the first stage of model training, each model is trained individually or using existing models and weights for transfer learning. The second stage of training then connects the trained small models to complete the end-to-end training of a large model.

In some embodiments, the gesture recognition independent model M1 is preferably a Convolutional Neural Network (CNN), a 3D Convolutional Neural Network (3D CNN), a Region-CNN (R-CNN), a Graph Convolutional Network (GCN), a Long Short-Term Memory (LSTM), a Bidirectional LSTM (Bi-LSTM), a Temporal Convolutional Network (TCN), an OpenPose model, a GestureNet model, a BlazePalm model, a Landmark model, a MediaPipe model, a Rekognition model, a Support Vector Machine (SVM), or a combination thereof.

In some embodiments, the information code recognition independent model M2 is preferably a ZBar model, an OpenCV model, a PyZbar model, a Google Vision model, or a combination thereof. The object recognition independent model M3 is preferably a YOLO (You Only Look Once) model, a SSD (Single Shot MultiBox Detector) model, a Faster R-CNN model, a Mask R-CNN model, a ResNet model, an EfficientDet model, an EfficientNet model, a VGG model, a VGGNet model, a COCO model, a CNN model, a MobileNet model, an AlexNet model, a GoogLeNet model, or a combination thereof.

Figure 5:
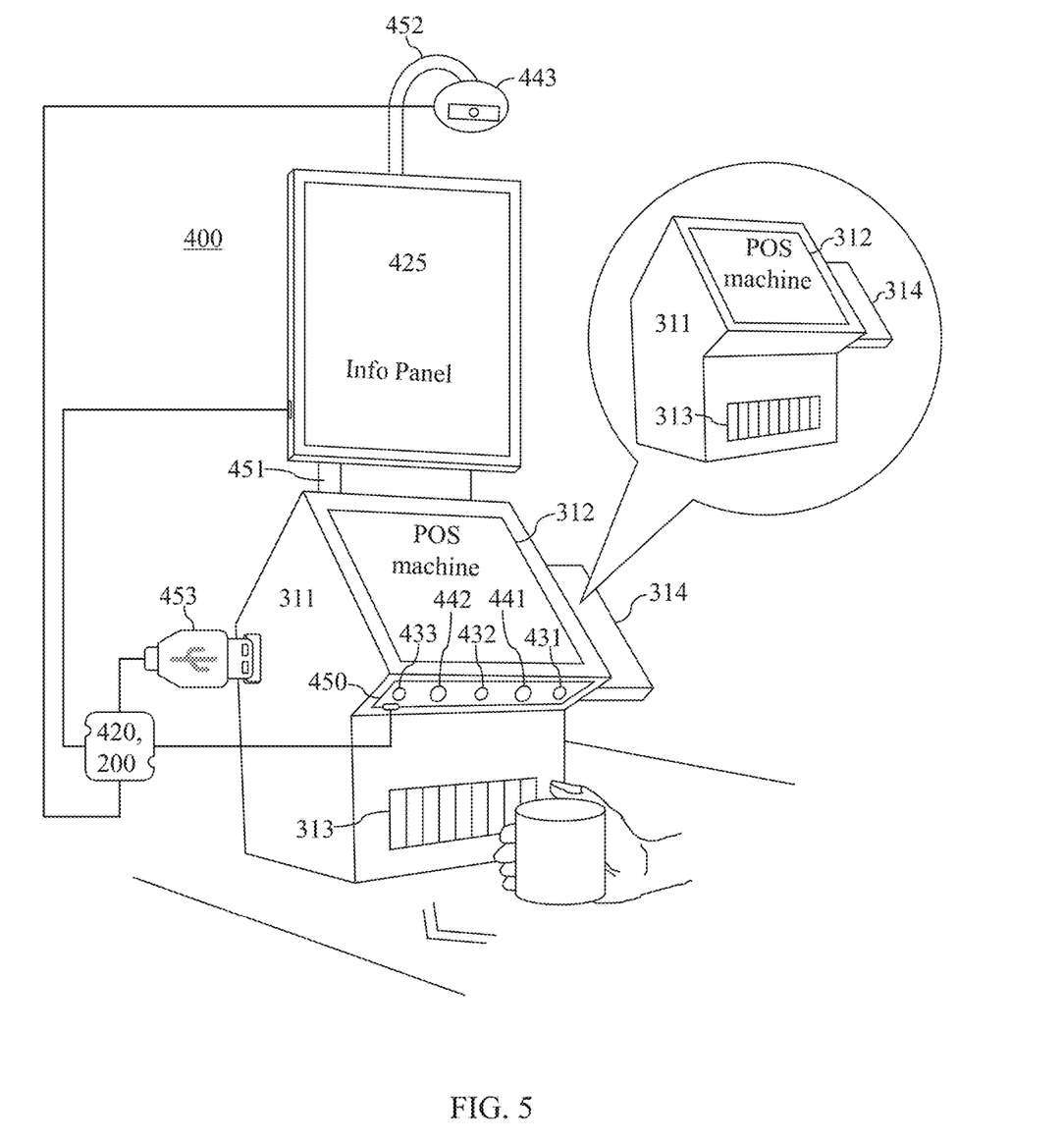
FIG. 5 is a schematic diagram illustrating the system architecture for the self-checkout separation kit included in the present invention.

FIG. 5 is a schematic diagram illustrating the system architecture for the self-checkout separation kit included in the present invention. In some embodiments, the self-checkout method provided by the present invention is further reduced to practice and implemented in the form of a self-checkout separation kit 400.

The existing checkout management devices 311, such as POS machines and cash registers, typically do not support user-operated self-checkout and require a dedicated in-house personnel to manually perform the checkout processes, including scanning item barcodes and operating the checkout interface to complete checkout actions. However, the existing checkout management devices 311 are already equipped with basic hardware components such as basic control circuits, touch screens 312, scanners 313, and card readers 314. By additionally linking and connecting a group of item sensors, an information panel, and self-checkout software 200, the existing checkout management devices 311 can be upgraded to the self-checkout devices with self-checkout functionality.

Therefore, the present invention further provides a self-checkout separation kit 400 that can provide the existing checkout management devices 311 with additional components needed for upgrading to self-checkout devices, including the first proximity sensor 431, the second proximity sensor 432, the third proximity sensor 433, the first smart image sensor 441, the second smart image sensor 442, a high-position smart image sensor 443, a control module 420, and an information display 425, wherein the control module 420 is already installed with the self-checkout software 200. After installing the self-checkout separation kit 400 according to the present invention, the existing checkout management devices 311 can be easily transformed into self-checkout devices with self-checkout functionality. The self-checkout separation kit 400 can enable the existing checkout management devices 311 with self-checkout functionality.

In some embodiments, the group of item sensors including the first proximity sensor 431, the second proximity sensor 432, the third proximity sensor 433, the first smart image sensor 441, and the second smart image sensor 442, are preferably integrated into a single item sensor assembly 450 and attached to the lower part of the checkout management device 311. The information display 425 is preferably configured and mounted at a position around the top of the checkout management device 311 by using a first bracket 451 or placed on one side of the checkout management device 311. The high-position smart image sensor 443 may also be mounted at a position higher than the checkout management device 311 by using a second bracket 452.

In some embodiments, components such as the first proximity sensor 431, the second proximity sensor 432, the third proximity sensor 433, the first smart image sensor 441, the second smart image sensor 442, the high-position smart image sensor 443, the control module 420, and the information display 425, are configured to communicate with the checkout management device 311 through appropriate communication interfaces, such as USB or HDMI transmission interfaces. In some embodiments, the control module 420 is preferably communicatively connected to the checkout management device 311 by using a USB OTG (On-The-Go) transmission interface.

Figure 6:
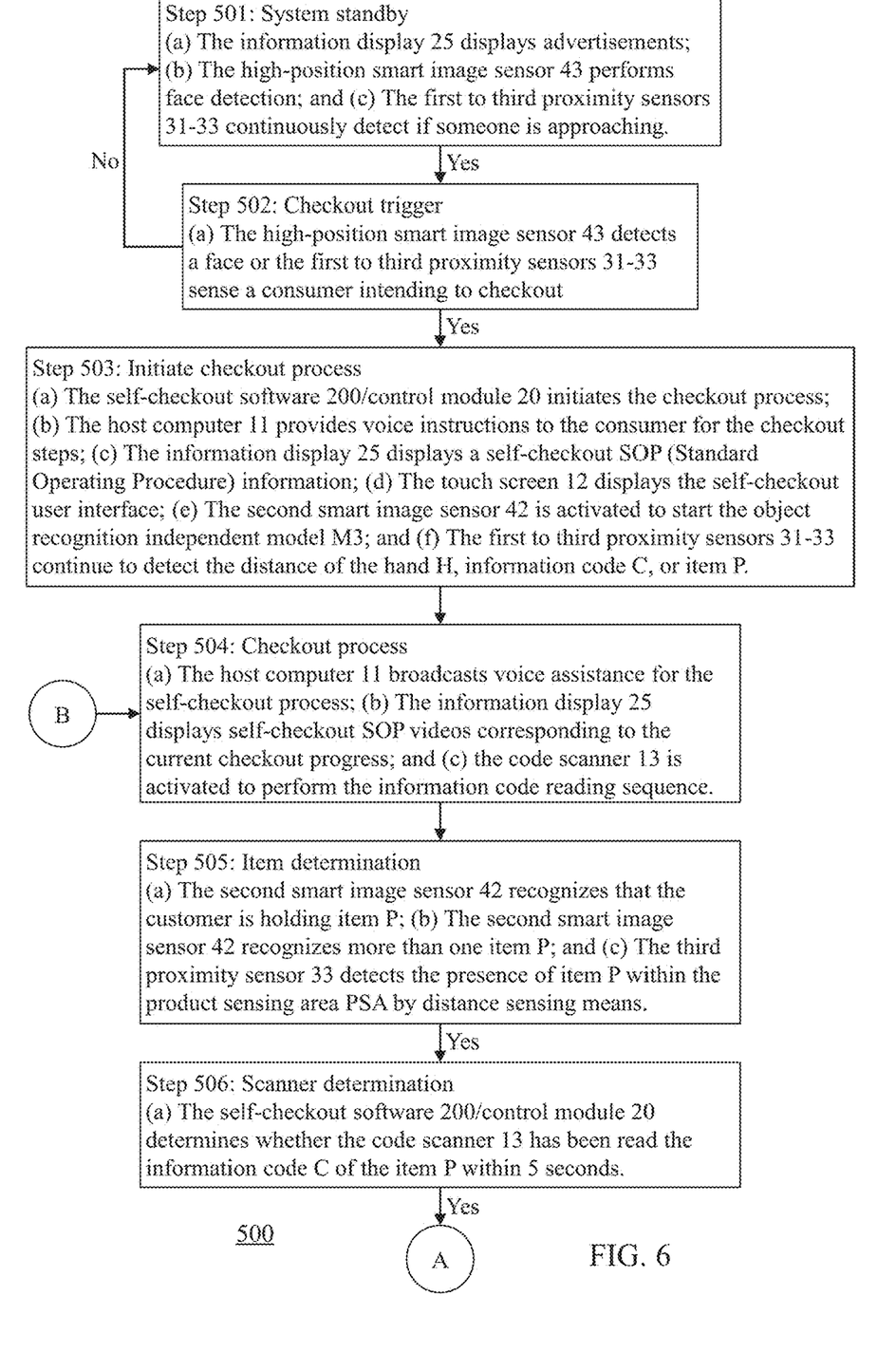
FIG. 6 is a first flowchart showing the implementation steps for the first self-checkout method included in the present invention.
Figure 7:
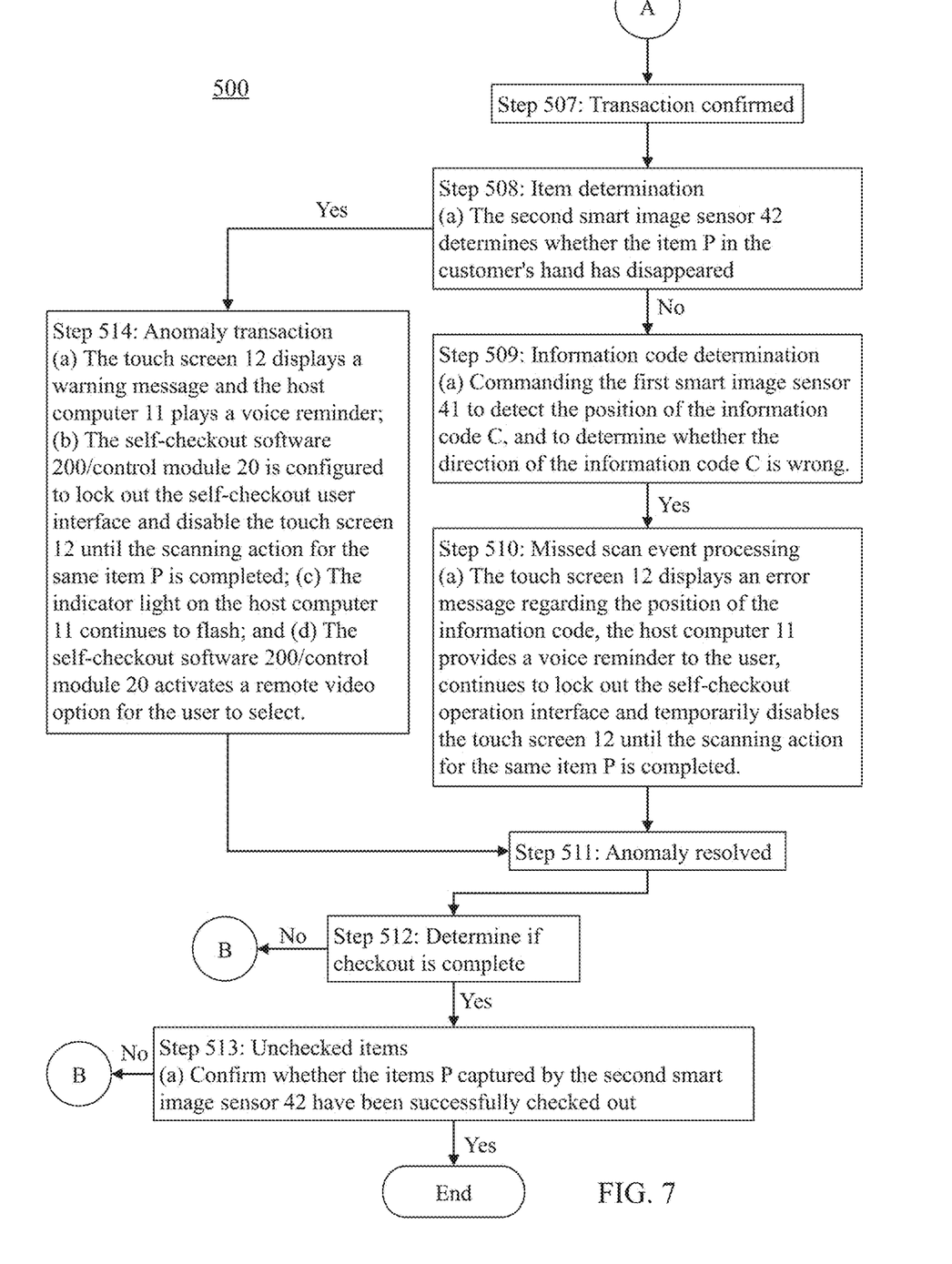
FIG. 7 is a second flowchart showing the implementation steps for the first self-checkout method included in the present invention.

FIG. 6 is a first flowchart showing the implementation steps for the first self-checkout method included in the present invention; FIG. 7 is a second flowchart showing the implementation steps for the first self-checkout method included in the present invention. Based on the aforementioned self-checkout system 100 as an example but not limited thereto, the first self-checkout method 500 provided by the present invention preferably includes, but is not limited to, the following steps:

Step 501: System Standby
  (a) The information display 25 displays advertisements; (b) The high-position smart image sensor 43 performs face detection; and (c) The first to third proximity sensors 31-33 continuously detect if someone is approaching, if YES, proceed to step 502.

Step 502: Checkout Trigger
  (a) The high-position smart image sensor 43 detects a face or the first to third proximity sensors 31-33 sense a consumer intending to checkout, if YES, proceed to step 503, if NO, return to step 501.

Step 503: Initiate Checkout Process
  (a) The self-checkout software 200/control module 20 initiates the checkout process; (b) The host computer 11 provides voice instructions to the consumer for the checkout steps; (c) The information display 25 displays a self-checkout SOP (Standard Operating Procedure) information; (d) The touch screen 12 displays the self-checkout user interface; (e) The second smart image sensor 42 is activated to start the object recognition independent model M3; and (f) The first to third proximity sensors 31-33 continue to detect the distance of the hand H, information code C, or item P.

Step 504: Checkout Process
  (a) The host computer 11 broadcasts voice assistance for the self-checkout process; (b) The information display 25 displays self-checkout SOP videos corresponding to the current checkout progress; and (c) the code scanner 13 is activated to perform the information code reading sequence.

Step 505: Item Determination
  (a) The second smart image sensor 42 recognizes that the customer is holding item P; (b) The second smart image sensor 42 recognizes more than one item P; and (c) The third proximity sensor 33 detects the presence of item P within the product sensing area PSA by distance sensing means, if YES, proceed to step 506.

Step 506: Scanner Determination
  (a) The self-checkout software 200/control module 20 determines whether the code scanner 13 has been read the information code C of the item P within 5 seconds, if YES, proceed to step 507.

Step 507: Transaction Confirmed

Step 508: Item Determination
  (a) The second smart image sensor 42 determines whether the item P in the customer's hand has disappeared, if NO, proceed to step 509, if YES, proceed to step 514.

Step 509: Information Code Determination
  (a) Commanding the first smart image sensor 41 to detect the position of the information code C, and to determine whether the direction of the information code C is wrong, if YES, proceed to step 510.

Step 510: Missed Scan Event Processing
  (a) The touch screen 12 displays an error message regarding the position of the information code, the host computer 11 provides a voice reminder to the user, continues to lock out the self-checkout operation interface and temporarily disables the touch screen 12 until the scanning action for the same item P is completed.

Step 511: Anomaly Resolved

Step 512: Determine if Checkout is Complete, if YES, Proceed to Step 513, if NO, Return to Step 504.

Step 513: Unchecked Items
  (a) Confirm whether the items P captured by the second smart image sensor 42 have been successfully checked out, if YES, end, if NO, return to step 504.

Step 514: Anomaly Transaction (a) The touch screen 12 displays a warning message and the host computer 11 plays a voice reminder; (b) The self-checkout software 200/control module 20 is configured to lock out the self-checkout user interface and disable the touch screen 12 until the scanning action for the same item P is completed; (c) The indicator light on the host computer 11 continues to flash; and (d) The self-checkout software 200/control module 20 activates a remote video option for the user to select.

Figure 8:
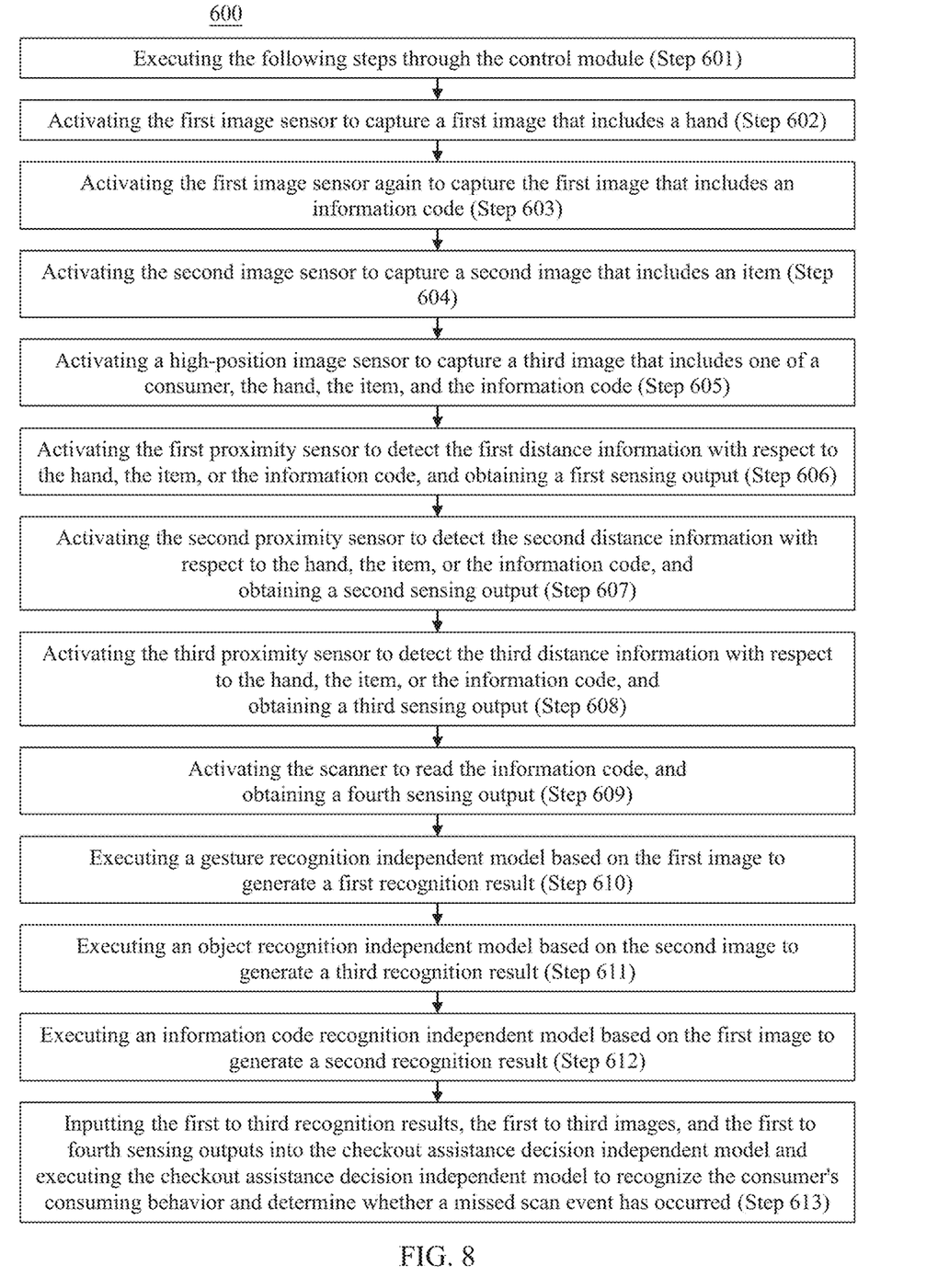
FIG. 8 is a flowchart showing the implementation steps for the second self-checkout method included in the present invention.

FIG. 8 is a flowchart showing the implementation steps for the second self-checkout method included in the present invention. The second self-checkout method 600 preferably includes, but is not limited to, the following steps: executing the following steps through the control module (Step 601): activating the first image sensor to capture a first image that includes a hand (Step 602); activating the first image sensor again to capture the first image that includes an information code (Step 603); activating the second image sensor to capture a second image that includes an item (Step 604); activating a high-position image sensor to capture a third image that includes one of a consumer, the hand, the item, and the information code (Step 605).

Activating the first proximity sensor to detect the first distance information with respect to the hand, the item, or the information code, and obtaining a first sensing output (Step 606); activating the second proximity sensor to detect the second distance information with respect to the hand, the item, or the information code, and obtaining a second sensing output (Step 607); activating the third proximity sensor to detect the third distance information with respect to the hand, the item, or the information code, and obtaining a third sensing output (Step 608); activating the scanner to read the information code, and obtaining a fourth sensing output (Step 609); executing a gesture recognition independent model based on the first image to generate a first recognition result (Step 610); executing an object recognition independent model based on the second image to generate a third recognition result (Step 611); executing an information code recognition independent model based on the first image to generate a second recognition result (Step 612); and inputting the first to third recognition results, the first to third images, and the first to fourth sensing outputs into the checkout assistance decision independent model and executing the checkout assistance decision independent model to recognize the consumer's consuming behavior and determine whether a missed scan event has occurred (Step 613).

There are further embodiments provided as follows.

Embodiment 1: A self-checkout method includes: executing following steps through a control module: activating a first image sensor to capture a first image that includes a hand; activating a second image sensor to capture a second image that includes an item; running a gesture recognition independent model to generate a first recognition result based on the first image; running an object recognition independent model to generate a third recognition result based on the second image; and executing and inputting the first recognition result and the third recognition result into a checkout assistance decision independent model to determine whether a missed scan event has occurred.

Embodiment 2: The self-checkout method as described in Embodiment 1 further includes: executing following steps through the control module: activating the first image sensor to capture the first image that includes an information code; activating a high-position image sensor to capture a third image that includes one of a consumer, the hand, the item, and the information code; activating a first proximity sensor to detect a first distance information with respect to the hand, the item, or the information code, and obtaining a first sensing output; activating a second proximity sensor to detect a second distance information with respect to the hand, the item, or the information code, and obtaining a second sensing output; activating a third proximity sensor to detect a third distance information with respect to the hand, the item, or the information code, and obtaining a third sensing output; activating a scanner to read the information code, and obtaining a fourth sensing output; running an information code recognition independent model to generate a second recognition result based on the first image; and inputting the first to third recognition results, the first to third images, and the first to fourth sensing outputs into the checkout assistance decision independent model and executing the checkout assistance decision independent model to recognize a consuming behavior for the consumer and determine whether the missed scan event has occurred.

Embodiment 3: The self-checkout method as described in Embodiment 2, the checkout assistance decision independent model is configured to execute one of following self-checkout decision rules: determining a barcode out-of-range event has occurred, when the distance of the information code is greater than a valid reading distance of the scanner; determining the missed scan event has occurred, when the third recognition result indicates that the item has been successfully detected but the scanner has not successfully read the information code; determining the missed scan event has occurred, when the third recognition result indicates that the item has been successfully detected and the second recognition result indicates that the information code has been successfully captured but the scanner has not successfully read the information code; determining the missed scan event has occurred, when the third recognition result indicates that the detected item quantity is greater than the item quantity successfully scanned by the scanner; determining a double checkout event has occurred, when the third recognition result indicates that the detected item quantity is less than the item quantity successfully scanned by the scanner; and determining an abnormal checkout event has occurred, when the third recognition result indicates that the successfully detected item has disappeared.

Embodiment 4: A self-checkout system includes: a first image sensor configured to capture a first image that includes a hand; a second image sensor configured to capture a second image that includes an item; and a control module configured to: run a gesture recognition independent model to generate a first recognition result based on the first image; run an object recognition independent model to generate a third recognition result based on the second image; and execute and input the first recognition result and the third recognition result into a checkout assistance decision independent model to determine whether a missed scan event has occurred.

Embodiment 5: The self-checkout system as described in Embodiment 4 further includes one of the following: the first image sensor configured to capture the first image that includes an information code; a high-position image sensor configured to capture a third image that includes one of a consumer, the hand, the item, and the information code; a first proximity sensor configured to detect a first distance information with respect to the hand, the item, or the information code, and to obtain a first sensing output; a second proximity sensor configured to detect a second distance information with respect to the hand, the item, or the information code, and to obtain a second sensing output;

a third proximity sensor configured to detect a third distance information with respect to the hand, the item, or the information code, and to obtain a third sensing output; a scanner configured to read the information code, and to obtain a fourth sensing output; and the control module configured to: run an information code recognition independent model to generate a second recognition result based on the first image; and execute and input the first to third recognition results, the first to third images, and the first to fourth sensing outputs into the checkout assistance decision independent model to thereby recognize a consumer's consuming behavior and determine whether the missed scan event has occurred.

Embodiment 6: A self-checkout device includes: a first image sensor configured to capture a first image that includes a hand; a second image sensor configured to capture a second image that includes an item; and a control module configured to: run a gesture recognition independent model to generate a first recognition result based on the first image; run an object recognition independent model to generate a third recognition result based on the second image; and execute and input the first recognition result and the third recognition result into a checkout assistance decision independent model to determine whether a missed scan event has occurred.

Embodiment 7: The self-checkout device as described in Embodiment 6 further includes one of the following: the first image sensor configured to capture the first image that includes an information code; a high-position image sensor configured to capture a third image that includes one of a consumer, the hand, the item, and the information code; a first proximity sensor configured to detect a first distance information with respect to the hand, the item, or the information code, and to obtain a first sensing output; a second proximity sensor configured to detect a second distance information with respect to the hand, the item, or the information code, and to obtain a second sensing output; a third proximity sensor configured to detect a third distance information with respect to the hand, the item, or the information code, and to obtain a third sensing output; a scanner configured to read the information code, and to obtain a fourth sensing output; and the control module configured to: run an information code recognition independent model to generate a second recognition result based on the first image; and execute and input the first to third recognition results, the first to third images, and the first to fourth sensing outputs into the checkout assistance decision independent model to thereby recognize a consumer's consuming behavior and determine whether the missed scan event has occurred.

Embodiment 8: A self-checkout kit, attachable to a checkout management device, includes: a first image sensor configured to capture a first image that includes a hand; a second image sensor configured to capture a second image that includes an item; and a control module, integrated within the checkout management device or configured separately from the checkout management device but communicatively connected to the checkout management device, configured to: run a gesture recognition independent model to generate a first recognition result based on the first image; run an object recognition independent model to generate a third recognition result based on the second image; and execute and input the first recognition result and the third recognition result into a checkout assistance decision independent model to determine whether a missed scan event has occurred.

Embodiment 9: The self-checkout kit as described in Embodiment 8 further includes one of the following: the first image sensor configured to capture the first image that includes an information code; a high-position image sensor configured to capture a third image that includes one of a consumer, the hand, the item, and the information code; a first proximity sensor configured to detect a first distance information with respect to the hand, the item, or the information code, and to obtain a first sensing output; a second proximity sensor configured to detect a second distance information with respect to the hand, the item, or the information code, and to obtain a second sensing output; a third proximity sensor configured to detect a third distance information with respect to the hand, the item, or the information code, and to obtain a third sensing output; a scanner configured to read the information code, and to obtain a fourth sensing output; and the control module configured to: run an information code recognition independent model to generate a second recognition result based on the first image; and execute and input the first to third recognition results, the first to third images, and the first to fourth sensing outputs into the checkout assistance decision independent model to thereby recognize a consumer's consuming behavior and determine whether the missed scan event has occurred.

Embodiment 10: The self-checkout kit as described in Embodiment 8, the checkout management device is a point of sale machine or a cash register.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A self-checkout method, comprising:
    executing following steps through a control module:
    activating a first image sensor to capture a first image that comprises a hand;
    activating a second image sensor to capture a second image that comprises an item;
    running a gesture recognition independent model to generate a first recognition result based on the first image;
    running an object recognition independent model to generate a third recognition result based on the second image; and
    executing and inputting the first recognition result and the third recognition result into a checkout assistance decision independent model to determine whether a missed scan event has occurred,
    wherein the self-checkout method further comprises one of the following:
        executing following steps through the control module:
            activating the first image sensor to capture the first image that comprises an information code;
            activating a high-position image sensor to capture a third image that comprises one of a consumer, the hand, the item, and the information code;

activating a first proximity sensor to detect a first distance information with respect to the hand, the item, or the information code, and obtaining a first sensing output;

activating a second proximity sensor to detect a second distance information with respect to the hand, the item, or the information code, and obtaining a second sensing output;

activating a third proximity sensor to detect a third distance information with respect to the hand, the item, or the information code, and obtaining a third sensing output;

activating a scanner to read the information code, and obtaining a fourth sensing output;

running an information code recognition independent model to generate a second recognition result based on the first image; and inputting the first to third recognition results, the first to third images, and the first to fourth sensing outputs into the checkout assistance decision independent model and executing the checkout assistance decision independent model to recognize a consuming behavior for the consumer and determine whether the missed scan event has occurred.

2. The self-checkout method as claimed in claim 1, wherein the checkout assistance decision independent model is configured to execute one of following self-checkout decision rules:

determining a barcode out-of-range event has occurred, when the distance of the information code is greater than a valid reading distance of the scanner;

determining the missed scan event has occurred, when the third recognition result indicates that the item has been successfully detected but the scanner has not successfully read the information code;

determining the missed scan event has occurred, when the third recognition result indicates that the item has been successfully detected and the second recognition result indicates that the information code has been successfully captured but the scanner has not successfully read the information code;

determining the missed scan event has occurred, when the third recognition result indicates that the detected item quantity is greater than the item quantity successfully scanned by the scanner;

determining a double checkout event has occurred, when the third recognition result indicates that the detected item quantity is less than the item quantity successfully scanned by the scanner; and determining an abnormal checkout event has occurred, when the third recognition result indicates that the successfully detected item has disappeared.

3. A self-checkout system, comprising:

a first image sensor configured to capture a first image that comprises a hand;

a second image sensor configured to capture a second image that comprises an item; and a control module configured to:

run a gesture recognition independent model to generate a first recognition result based on the first image;

run an object recognition independent model to generate a third recognition result based on the second image; and execute and input the first recognition result and the third recognition result into a checkout assistance decision independent model to determine whether a missed scan event has occurred, wherein the self-checkout system further comprises one of the following:

the first image sensor configured to capture the first image that comprises an information code;

a high-position image sensor configured to capture a third image that comprises one of a consumer, the hand, the item, and the information code;

a first proximity sensor configured to detect a first distance information with respect to the hand, the item, or the information code, and to obtain a first sensing output;

a second proximity sensor configured to detect a second distance information with respect to the hand, the item, or the information code, and to obtain a second sensing output;

a third proximity sensor configured to detect a third distance information with respect to the hand, the item, or the information code, and to obtain a third sensing output;

a scanner configured to read the information code, and to obtain a fourth sensing output; and the control module configured to:

run an information code recognition independent model to generate a second recognition result based on the first image; and execute and input the first to third recognition results, the first to third images, and the first to fourth sensing outputs into the checkout assistance decision independent model to thereby recognize a consumer's consuming behavior and determine whether the missed scan event has occurred.

4. A self-checkout device, comprising:

a first image sensor configured to capture a first image that comprises a hand;

a second image sensor configured to capture a second image that comprises an item; and a control module configured to:

run a gesture recognition independent model to generate a first recognition result based on the first image;

run an object recognition independent model to generate a third recognition result based on the second image; and execute and input the first recognition result and the third recognition result into a checkout assistance decision independent model to determine whether a missed scan event has occurred, wherein the self-checkout device further comprises one of the following:

the first image sensor configured to capture the first image that comprises an information code;

a high-position image sensor configured to capture a third image that comprises one of a consumer, the hand, the item, and the information code;

a first proximity sensor configured to detect a first distance information with respect to the hand, the item, or the information code, and to obtain a first sensing output;

a second proximity sensor configured to detect a second distance information with respect to the hand, the item, or the information code, and to obtain a second sensing output;

a third proximity sensor configured to detect a third distance information with respect to the hand, the item, or the information code, and to obtain a third sensing output;

a scanner configured to read the information code, and to obtain a fourth sensing output; and the control module configured to:
run an information code recognition independent model to generate a second recognition result based on the first image; and
execute and input the first to third recognition results, the first to third images, and the first to fourth sensing outputs into the checkout assistance decision independent model to thereby recognize a consumer's consuming behavior and determine whether the missed scan event has occurred.

5. A self-checkout kit, attachable to a checkout management device, comprising:
a first image sensor configured to capture a first image that comprises a hand;
a second image sensor configured to capture a second image that comprises an item; and
a control module, integrated within the checkout management device or configured separately from the checkout management device but communicatively connected to the checkout management device, configured to:
run a gesture recognition independent model to generate a first recognition result based on the first image;
run an object recognition independent model to generate a third recognition result based on the second image; and
execute and input the first recognition result and the third recognition result into a checkout assistance decision independent model to determine whether a missed scan event has occurred,
wherein the self-checkout kit further comprises one of the following:
the first image sensor configured to capture the first image that comprises an information code;
a high-position image sensor configured to capture a third image that comprises one of a consumer, the hand, the item, and the information code;
a first proximity sensor configured to detect a first distance information with respect to the hand, the item, or the information code, and to obtain a first sensing output;
a second proximity sensor configured to detect a second distance information with respect to the hand, the item, or the information code, and to obtain a second sensing output;
a third proximity sensor configured to detect a third distance information with respect to the hand, the item, or the information code, and to obtain a third sensing output;
a scanner configured to read the information code, and to obtain a fourth sensing output; and
the control module configured to:
run an information code recognition independent model to generate a second recognition result based on the first image; and
execute and input the first to third recognition results, the first to third images, and the first to fourth sensing outputs into the checkout assistance decision independent model to thereby recognize a consumer's consuming behavior and determine whether the missed scan event has occurred.

6. The self-checkout kit as claimed in claim 5, wherein the checkout management device is a point of sale machine or a cash register.

* * * * *